United States Patent [19]
Orkin et al.

[11] 3,711,171
[45] Jan. 16, 1973

[54] CERAMIC BEARINGS

[75] Inventors: Stanley S. Orkin, Rockville; Alan A. Whitfield, Glastonbury, both of Conn.

[73] Assignee: KAcarb Products Corporation, Bloomfield, Conn.

[22] Filed: Dec. 8, 1969

[21] Appl. No.: 883,127

[52] U.S. Cl. ............... 308/241, 106/39 R, 106/50, 106/65, 308/238, 308/72
[51] Int. Cl. ............... F16c 33/12, C04b 35/00
[58] Field of Search ..... 308/238, 241, 241 M, 241 N, 308/240; 106/65, 50, 39

[56] References Cited

UNITED STATES PATENTS

| 3,384,578 | 5/1968 | Stuber | 106/65 X |
| 3,037,828 | 6/1952 | Michael | 308/241 M |
| 3,268,272 | 8/1966 | Shulhof | 308/238 X |
| 3,273,944 | 9/1966 | Hammon | 308/241 X |
| 3,428,374 | 2/1969 | Orkin et al | 308/238 X |

Primary Examiner—Martin P. Schwadron
Assistant Examiner—Barry Grossman
Attorney—Cushman, Darby & Cushman

[57] ABSTRACT

A bearing comprising two coengaging members movable relative to one another, the bearing surfaces of said members being provided by a body of ceramic material and a film of solid lubricant interposed and in engagement with both said bearing surfaces.

4 Claims, 4 Drawing Figures

PATENTED JAN 16 1973 3,711,171
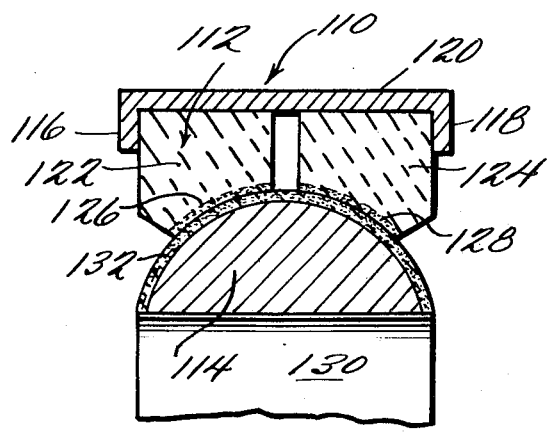
Fig. 1
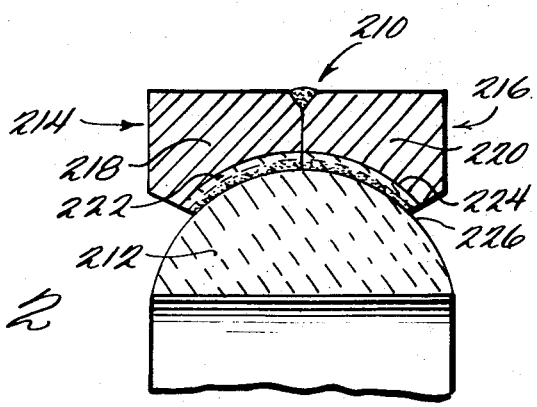
Fig. 2
Fig. 3
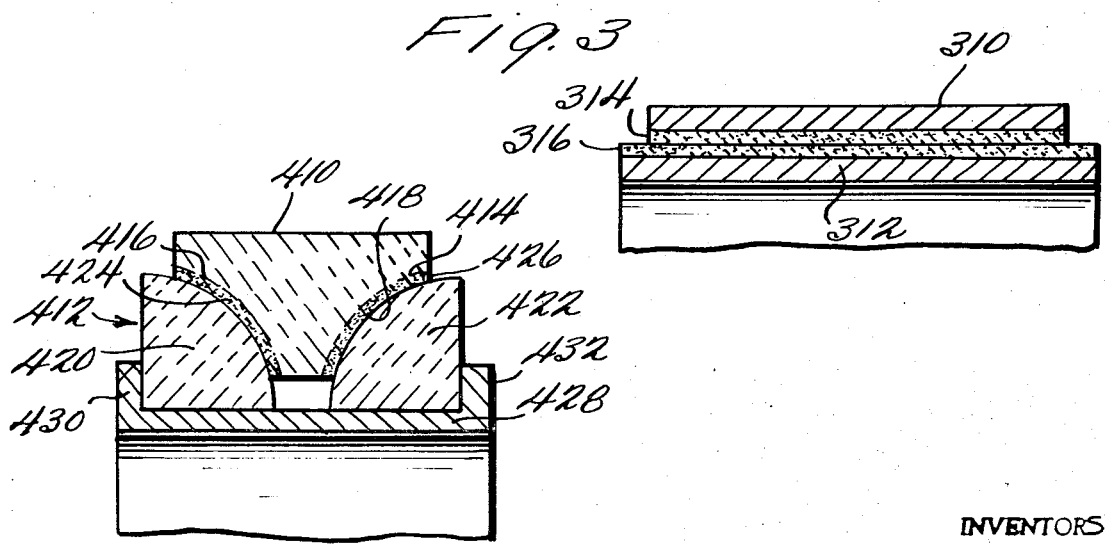
Fig. 4
INVENTORS
STANLEY S. ORKIN
ALAN A. WHITFIELD
BY Cushman, Darby & Cushman
ATTORNEYS

CERAMIC BEARINGS

The present invention relates generally to bearings exhibiting low wear rate, excellent chemical stability, wide temperature resistance and immunity to environmental and chemical contamination or degradation.

More particularly, the present invention is concerned with a bearing comprising two coengaging members movable relative to one another with the surfaces of said members being formed of a body of ceramic material and a film of solid lubricant interposed and in engagement with both said members.

The bearing of this invention can be of the self-aligning or non-aligning type and representative bearing structures suitably employed in the present invention are shown, for instance, in commonly assigned applications, Ser. No. 792,183, filed Nov. 20, 1968, now U.S. Pat. No. 3,535,005 and Ser. No. 800,143, filed Feb. 18, 1969, now U.S. Pat. No. 3,578,828. Thus, the bearing structure of this invention can include an inner race and an outer race, either of which can be a unitary member or a split member or combinations thereof. However, as a significant departure from the bearings shown in these applications, the bearings of the present invention are so fabricated that the bearing surfaces of both the inner and outer races consist of a ceramic material with a film of solid lubricant interposed therebetween.

Thus, the ceramic surfaces of the bearing can be provided by solid ceramic races or races comprising a metallic substrate coated with a layer of ceramic material or combinations thereof. When one or both races are constructed from a metallic substrate coated with a layer of ceramic material, the metal substrate is one which has a relatively high tensile strength in comparison to that of the ceramic, and a high resistance to corrosion. Suitable metal substrates are fabricated from titanium, titanium alloys, ferrous alloys such as stainless steel and high temperature material such as cobalt, nickel, molybdenum or chromium base alloys, and aluminum and aluminum base alloys. The layer of ceramic coating is sufficiently thin to permit slight deformation thereof, as a result of deformation of the substrate under load, without its fracturing, to achieve a transferal of the surface stresses, which would otherwise build up in the coating, to the substrate. Furthermore, the tensile strength of the substrate must be within a particular range. If the tensile strength is too low, the substrate will not provide proper support or backing for the coating and under load the substrate will deform to too large an extent and cause fracture of the coating. If the tensile strength of the substrate is too high, the substrate will not provide a proper cushioning effect, surface stresses will not be transferred to the substrate and the ceramic coating will fracture or otherwise fail as a result of such stresses. In particular, it is found that the tensile strength of the substrate should lie within the range of 35,000 to 250,000 psi to achieve a proper balance between the tendency of the coating to fracture as a result of deformation and the tendency of the coating to fracture as a result of surface stresses. Also, the coating must have a thickness ranging between 0.0005 to 0.010 inch, a thickness of 0.004 inch being preferred.

The material of the ceramic coating used on the metal substrate may vary widely; and it has been found that ceramic coating materials such as chromium oxide ($Cr_2O_3$), titanium dioxide ($TiO_2$), aluminum oxide ($Al_2O_3$), tungsten carbide (WC) and titanium carbide (TiC) are especially useful. The particular ceramic coating material chosen which can be applied to the metallic substrate by, for instance, plasma spraying, can be used either in substantially pure form, in admixture with other ceramic materials or in combination with other additives intended to produce a more desirable coating or to facilitate the application of the coating to the substrate. Examples of mixtures which can be used are (80% $Cr_2O_3$ + 20% NiCr), (TiC + 5–20% Ni), (50% WC + 35% NiCr + 15% NiAl) and (WC + 9% Co), where NiCr is made up of 80% Ni and 20% Cr and wherein the percentages given are volume percentages.

When one or both races are constructed of solid ceramic material, such races can be made by pressing particles of the ceramic material into a compact form of the desired shape or configuration under a pressure ranging from about 5 to 60 tons/sq.in. and sintering the resulting compact under conventional sintering conditions such as at a temperature of about 600° to 1,700°C. for a period of time ranging from about 2 to 48 hours. The ceramic material chosen for producing a solid ceramic race can be any of those identified above with respect to the ceramic coating for a metallic substrate. Additionally, the compacted ceramic particles can be admixed with fibers of aluminum oxide, carbon or boron, randomly or uniformly oriented therethrough to increase the strength capability of the resulting sintered amalgamation of high load carrying refractory materials. Generally, such fibers will comprise about 5 to 25 weight percent of the resulting race. It has also been found advantageous to include other additives into the solid ceramic body such as beryllium oxide in amounts of 3 to 12 weight percent to enhance the thermal conductivity characteristics of the resulting race. The ceramic particles can be compacted and sintered to provide a relatively dense body, i.e., one having a density of about 1.78 gms/cc to 9.0 gms/cc. On the other hand, the ceramic particles can be compacted to provide a porous body, i.e., one having a density of about 2.5 to 9.0 gms/cc and a percent porosity ranging from about 15 to 2 percent. Typical of a porous ceramic body is one having a honeycomb structure.

As indicated above, a film of solid lubricant is interposed and in engagement with the opposed or mating surfaces of the races. Representative of solid lubricants suitable for use with the bearing of this invention are tungsten disulfide, niobium deselenide, graphite, tantalum disulfide, silver, calcium fluoride and antimony, metallic fluorides and ditellurides. The amount of solid lubricant employed will be sufficient to produce a thin film at the surface of the race and can be provided by mechanically burnishing the same onto the ceramic surface of the race. Generally, the ceramic surface will be sufficiently porous to provide a reservoir for the burnished lubricant and the porosity of the surface should not extend to a depth greater than about 0.001 inch to insure good load support for the remaining ceramic body. Alternatively, the solid lubricant can be admixed with the ceramic materials prior to applying the same to a metal substrate as by plasma spraying. In yet another embodiment, the solid lubricant can be admixed with the ceramic particles prior to compacting and sintering the same into a solid ceramic race. In such an instance, it has been found convenient to employ the solid lubricant material in amounts ranging from about 3 to 40 weight percent of the ceramic particles to insure a sufficient quantity of solid lubricant at the surface of the resulting race. In still another embodiment, a porous surface of either one or both of the races can be impregnated with a solid lubricant by the use of vacuum and high applied pressures and heat or chemical infiltration methods whereby the solid lubricant is caused to flow into the pores existing at and immediately subjacent the ceramic surface of the race. It is also contemplated that the solid lubricant film can be provided by inserting a member made of said lubricant between the opposed mating surfaces of the races or bearing members. This lubricant member can have any desired shape such as a ring and it need not be capable of supporting the bearing load but will supply a lubricating film to the two opposing ceramic surfaces by means of a wiping action.

Because the solid lubricant has a high viscosity, bleeding of the lubricant is essentially avoided and the film of lubricant exhibits low friction and shear strength, good wetability, high load carrying capacity, a low coefficient of expansion and a high coefficient of heat conduction. This combination results in a lubricating medium providing long life at high oscillating velocities and loads and the ceramic bearing of this invention, because of its chemical and physical inertness characteristics, enable its use at high temperatures and in highly corrosive environments.

Representative bearings embodying the present invention are shown in the drawings wherein FIG. 1 is a fragmentary sectional view of the upper half of a self-aligning bearing of this invention having a steel outer race housing encasing a split solid ceramic outer race and an inner race made from a ceramic coated metallic substrate;

FIG. 2 is a fragmentary sectional view of the upper half of another self-aligning bearing of this invention having a split ceramic coated metallic substrate outer race and an inner race made from a solid ceramic body;

FIG. 3 is a fragmentary sectional view of the upper half of a non-aligning bearing of this invention wherein the outer and inner races are each made from a ceramic coated metallic substrate; and FIG. 4 is a fragmentary sectional view of the upper half of another non-aligning bearing of this invention wherein the outer race is a unitary solid ceramic member and the inner race is a split solid ceramic member.

Referring now to the Figures and specifically Fig. 1, a first embodiment of the invention is illustrated wherein the bearing construction comprises an outer race housing 110, an outer race 112 and an inner race 114. The outer race housing 110 is an annular member made of steel or some other suitable material and is channel-shaped in transverse axial cross section having two inwardly extending annular shoulders or flanges 116, 118 joined by a web 120. The outer race 112 is mounted within housing 110 in a manner to prevent relative movement between the two parts. This can be achieved by press-fitting the split outer race into the housing 110 and then upsetting the ends of web 120 to form shoulders 116, 118 which engage the end faces of the split outer race 112. Of course, it is contemplated that the split outer race 112 can be mounted within housing 110 by other methods such as bonding and the like if desired. The split outer race 112 comprises two annular members 122, 124, each made of a solid ceramic with the inner bearing surfaces 126, 128 having spherical curvatures which cooperate with the inner race 114 to permit relative sliding movement between the inner and outer races. The inner bearing surfaces 126, 128 are provided with a solid lubricant, tungsten disulfide, which, in addition to being present on the surfaces thereof as a thin film, fills the pores of the ceramic bodies 122, 124 immediately subjacent the bearing surfaces 126, 128 to a depth no greater than 0.001 inch.

The inner race 114 consists of a titanium substrate 130 having a tensile strength of 160,000 psi and provided on its surface with a 0.004 inch coating of chromium oxide. The outer bearing surface 132 is complementary to the annular bearing surfaces 126, 128 of the outer race 112. The outer bearing surface 132 is also provided with a solid lubricant, tungsten disulfide, which is present on the surface thereof as a thin film. The thin film of solid lubricant is produced by admixing the solid lubricant with particles of aluminum oxide, the mixture having been applied to the titanium substrate 130 by conventional plasma spraying techniques.

Similar bearings can be produced using as the ceramic material for both inner and outer races, chromium oxide, tungsten carbide, titanium oxide and the like. Also, instead of tungsten disulfide, the solid lubricant can be niobium deselenide, graphite, tantalum disulfide, silver, calcium fluoride or any other similar high viscosity solid lubricant.

FIG. 2 illustrates a second embodiment of the present invention having a split outer race 210 and an inner race 212. The split outer race 210 comprises two annular members 214 and 216 joined at their internal end faces by electron beam welding, or plasma arc welding, each member being made of an aluminum substrate 218, 220 having a tensile strength of 70,000 psi and provided with a 0.004 inch coating of chromium oxide at the inner bearing surfaces 222, 224 each of which have spherical curvatures which cooperate with the inner race 212. The bearing surfaces 222, 224 are provided with a solid lubricant, graphite, which has been mechanically burnished thereon. The members 214 and 216 can be joined by other means such as by an adhesive or solder or in any other convenient manner.

The inner race 212 consists of a solid ceramic member made of chromium oxide having a density of 4.87 gms/cc and with a honeycomb-like structure having a porosity value of 15 percent. The outer bearing surface 226 is complementary to the annular bearing surfaces 222, 224 of the outer race 210.

FIG. 3 illustrates a third embodiment of the present invention wherein a non-aligning bearing comprises an outer race 310 and a tubular inner race 312. The outer race 310 comprises a stainless steel member having a tensile strength of 135,000 psi and provided with a 0.004 inch coating of titanium carbide at the inner bearing surface 314.

The inner race 312 also comprises a stainless steel tubular member having a tensile strength of 135,000 psi and provided with a 0.004 inch coating of titanium carbide at the outer bearing surface 316 which bearing surface is also provided with a film of solid lubricant, tantalum disulfide, which has been mechanically burnished onto the bearing surface 316.

Similar non-aligning bearings can be fabricated using as the metallic substrate titanium and titanium alloys as well as aluminum and aluminum alloys or high temperature alloys of nickel, cobalt and/or chromium. Instead of tantalum disulfide, other solid lubricants such as tungsten disulfide, silver, graphite and metallic fluorides and ditellurides can be employed and can be applied to the bearing surface 316 by other means such as by admixing the solid lubricant with ceramic particles and plasma spraying the admixture onto the outer surface of the metallic substrate.

FIG. 4 illustrates another embodiment of the present invention wherein the bearing construction comprises an outer race 410 and a split inner race 412. The outer race 410 consists of an annular solid ceramic member, preferably chromium oxide which has been produced from a mixture of chromium oxide particles and tungsten disulfide particles present in an amount of about 30 weight percent of the mixture, the mixture having been compacted under a pressure of about 20–30 tons/sq.in. and sintered at a temperature of about 1,000–1,100°C. for about 3–10 hours in an inert atmosphere. The tungsten disulfide is present in amounts sufficient to form a thin film thereof at the inner bearing surface 414 which comprises a pair of opposed annular bearing seats 416, 418 having concave spherical curvatures which cooperate with the split inner race 412.

The split inner race 412 comprises two annular members 420, 422. These annular members are formed of chromium oxide and the outer bearing surfaces 424, 426 are complementary to the annular bearing surfaces 416, 418 of the outer race 410.

The members 420, 422 are held in contact with the bearing surfaces 416, 418 of the outer race 410 by means of a cylindrical bushing 428 which has integral shoulders 430, 432 press fitted against the end faces of members 420, 422.

While certain preferred forms of the invention have been shown and described, it is to be understood that all suitable modifications and equivalents can be employed which fall within the scope of the invention.

What is claimed is:

1. A bearing comprising two co-engaging members movable relative to one another, the bearing surfaces of said members being provided by a body of ceramic material and a film of solid lubricant interposed and in engagement with both said bearing surfaces, the body of ceramic material of one of said members comprising a ceramic coating on a metallic substrate, said coating having a thickness ranging from 0.0005 to 0.01 inch and the metallic substrate having a tensile strength ranging from 35,000 to 250,000 psi, the body of ceramic material of the other of said members being selected from the group consisting of (a) solid ceramic and (b) a ceramic coating on a metallic substrate, said coating having a thickness ranging from 0.0005 to 0.01 inch and the metallic substrate having a tensile strength ranging from 35,000 to 250,000 psi, said ceramic material being selected from the group consisting of chromium oxide, aluminum oxide, beryllium oxide, tungsten carbide, titanium dioxide, titanium carbide and their mixtures, said solid lubricant being selected from the group consisting of tungsten disulfide, niobium deselenide, graphite, tantalum disulfide, silver, calcium fluoride, metallic ditelluride and antimony, and said metallic substrate being selected from the group consisting of titanium, titanium base alloys, ferrous alloys, aluminum and aluminum base alloys, or cobalt, nickel, chromium or molybdenum base alloys.

2. The bearing of claim 1 wherein one of said members is solid ceramic having dispersed therethrough fibers of a member selected from the group consisting of aluminum oxide, carbon and boron.

3. The bearing of claim 2 wherein said fibers are randomly oriented therein.

4. The bearing of claim 2 wherein said fibers are regularly oriented therein.

* * * * *